(12) United States Patent
Geiger

(10) Patent No.: US 7,966,177 B2
(45) Date of Patent: Jun. 21, 2011

(54) METHOD AND DEVICE FOR RECOGNISING A PHONETIC SOUND SEQUENCE OR CHARACTER SEQUENCE

(76) Inventor: Hans Geiger, Wessobrunn (DE)

(*) Notice: Subject to any disclaimer, the term of this patent is extended or adjusted under 35 U.S.C. 154(b) by 1484 days.

(21) Appl. No.: 10/486,847

(22) PCT Filed: Aug. 13, 2001

(86) PCT No.: PCT/EP01/09353
§ 371 (c)(1),
(2), (4) Date: Feb. 12, 2004

(87) PCT Pub. No.: WO03/017252
PCT Pub. Date: Feb. 27, 2003

(65) Prior Publication Data
US 2004/0199389 A1    Oct. 7, 2004

(51) Int. Cl.
*G10L 15/16* (2006.01)
*G10L 11/00* (2006.01)
*G10L 15/00* (2006.01)

(52) U.S. Cl. .................. 704/232; 704/202; 704/257

(58) Field of Classification Search .................. 704/232, 704/254, 257, 270, 275; 382/229, 156, 181, 382/186, 187, 230
See application file for complete search history.

(56) References Cited

U.S. PATENT DOCUMENTS

| | | | | |
|---|---|---|---|---|
| 5,040,215 A | * | 8/1991 | Amano et al. | 704/232 |
| 5,179,624 A | * | 1/1993 | Amano et al. | 704/232 |
| 5,276,741 A | * | 1/1994 | Aragon | 382/229 |
| 5,404,422 A | * | 4/1995 | Sakamoto et al. | 704/232 |
| 5,440,651 A | * | 8/1995 | Martin | 382/156 |
| 5,471,557 A | * | 11/1995 | Chung et al. | 704/232 |
| 5,528,728 A | * | 6/1996 | Matsuura et al. | 704/232 |

(Continued)

FOREIGN PATENT DOCUMENTS
DE    19804603    8/1999

OTHER PUBLICATIONS

Alvarez-Cercadillo, Jorge et al. "Context Modeling Using RNN for Keyword Detection." ICASSP-93, IEEE International Conference on Acoustics, Speech, and Signal Processing, vol. 1, 1993, pp. 569-572.*

(Continued)

*Primary Examiner* — James S Wozniak
*Assistant Examiner* — Jialong He
(74) *Attorney, Agent, or Firm* — Brooks Kushman P.C.

(57) ABSTRACT

The invention relates to a method for recognizing a phonetic sound sequence or a character sequence, e.g. according to the ASCII standards, comprising the following steps: a) the sequence is fed to a neural network, b) in said neural network, a sequence of characteristics is formed from the phonetic sequence or character sequence, by taking into consideration phonetic and/or lexical stored information and/or based on a character string sequence (blank characters), c) the character sequence thus formed is compared with a characteristic combination that has a defined statement content, said combination being formed from stored lexical and semantic information, based on the characteristic sequence, d) step c is repeated using new character combinations until, by the reduction of contradictions, a character combination is found that at least largely corresponds with the character sequence, e) the statement content of the character combination with the least number of contradictions is output as the result and/or an action assigned to the statement content is carried out.

19 Claims, 1 Drawing Sheet

U.S. PATENT DOCUMENTS

| | | | | |
|---|---|---|---|---|
| 5,638,425 A | * | 6/1997 | Meador et al. | 379/88.01 |
| 5,638,487 A | * | 6/1997 | Chigier | 704/253 |
| 5,640,490 A | * | 6/1997 | Hansen et al. | 704/254 |
| 5,727,124 A | * | 3/1998 | Lee et al. | 704/233 |
| 5,737,485 A | | 4/1998 | Flanagan et al. | |
| 5,758,022 A | * | 5/1998 | Trompf et al. | 704/232 |
| 5,799,276 A | * | 8/1998 | Komissarchik et al. | 704/251 |
| 5,809,462 A | * | 9/1998 | Nussbaum | 704/232 |
| 5,864,803 A | * | 1/1999 | Nussbaum | 704/232 |
| 5,937,383 A | * | 8/1999 | Ittycheriah et al. | 704/255 |
| 6,026,177 A | * | 2/2000 | Mong et al. | 382/156 |
| 6,138,098 A | * | 10/2000 | Shieber et al. | 704/257 |
| 6,185,528 B1 | * | 2/2001 | Fissore et al. | 704/232 |
| 6,208,963 B1 | * | 3/2001 | Martinez et al. | 704/232 |
| 6,374,217 B1 | * | 4/2002 | Bellegarda | 704/240 |
| 6,442,295 B2 | * | 8/2002 | Navoni et al. | 382/229 |
| 6,732,074 B1 | * | 5/2004 | Kuroda | 704/244 |
| 6,823,307 B1 | * | 11/2004 | Steinbiss et al. | 704/252 |
| 6,937,983 B2 | * | 8/2005 | Romero | 704/257 |
| 2002/0059069 A1 | * | 5/2002 | Hsu et al. | 704/257 |
| 2002/0087317 A1 | * | 7/2002 | Lee et al. | 704/257 |
| 2002/0120448 A1 | * | 8/2002 | Garner et al. | 704/254 |

OTHER PUBLICATIONS

Joe Tebelskis, "Speech Recognition using Neural Networks", PhD Thesis, School of Computer Science, Carnegie Mellon University, May 1995.*

Wermter et al. "SCREEN: Learning a flat syntactic and semantic spoken langauge analysis using artificial neural networks," Journal of Artificial Intelligence Research, vol. 6, pp. 35-85, Jan. 1997.*

Oppizzi et al., "Restoring under Fuzzy Measures with a Multilayer Neural Network in a Rule-Based Speech Recognition System" 1997 IEEE International Conference on Acoustics, Speech and Signal Processing (Cat. No. 97CB36052), 1997, Apr. 21-24, 1997, pp. 1723-1726.

Castano et al., "Preliminary Experiments for Automatic Speech Understanding Through Simple Recurrent Networks", 4th European Conference on Speech Communication and Technology, Eurospeech '95, Sep. 18-21, 1995, pp. 1673-1676.

English Translation of Description of German Patent DE19804603.

International Search Report for PCT/EP01/09353 dated Jun. 4, 2002.

* cited by examiner mentioned, it is also provided that the features and combinations of features from the just-completed recognition are accessed.

METHOD AND DEVICE FOR RECOGNISING A PHONETIC SOUND SEQUENCE OR CHARACTER SEQUENCE

This is a national stage application filed under 35 USC 371 based on International Application No. PCT/EP2001/009353 filed Aug. 13, 2001.

TECHNICAL FIELD

The present invention relates to a method and a device for recognizing a sequence of phonetic sounds or characters, for example a character string that complies with the ASCII standard.

BACKGROUND

In many computer applications, control commands are entered in a statically defined form that is defined by the command language of the computer software. Inputs that do not correspond exactly to the specified command statements are not recognized or processed at all. The input can either be generated by entering a sequence of characters via the keyboard or by speaking a control command into a microphone that is connected to a speech recognition system. Regardless of how the control command is input, it is always necessary for the input/recognized control command to precisely correspond to a control command specified by the computer software.

U.S. Pat. No. 5,737,485 discloses a system for speech recognition in which feature extractors are provided, both downstream from a microphone for close-talking and downstream of a microphone system for distant-talking, said feature extractors forming a sequence of features from a sequence of phonetic sounds. The sequence of features of the captured close-talking and distant-talking information is sent to a neural network that is provided to establish correlations between distorted features and largely distortion-free features in a learning phase and then later, in the speech recognition phase, to replace distorted features with features that are largely distortion-free and are consistent with the learned knowledge before the features are sent to a speech recognition means. The disadvantage of this system is its inability to react dynamically to changes in the generation of the sounds. In addition, the recognition of unclearly spoken words is not improved by the system.

DE 198 04 603 discloses a speech recognition system that uses a phonetic sequence to generate a sequence of features in the form of test signals. These test signals are then compared with the lexical knowledge in the form of reference signals, whereby sequences of reference signals represent words that are obtained from a training signal. The purpose of this is to improve the speech recognition means by not only comparing the features in the form of the test signals with the thus learned vocabulary but also with learned combinations of sentence elements that are most likely to occur. This does not, however improve the accuracy of speech recognition in the case of unclearly pronounced words.

SUMMARY

The object of the present invention is now to discover a method and device that permit unformatted language or commands to be input, and that also permit the improved recognition of the speech or commands if said speech or commands are pronounced unclearly, in a different manner, or by different persons.

DETAILED DESCRIPTION

Figure 1:
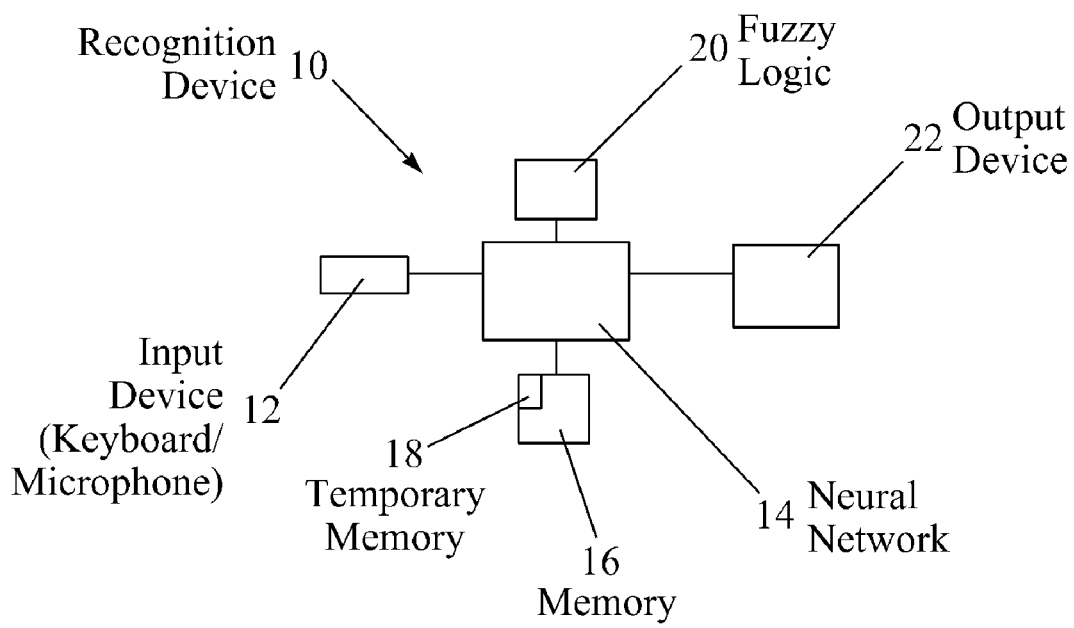
FIG. 1 shows a recognition apparatus for phonetic sequences or character sequences.

In the invention, the input sequence of characters or phonetic sequence of sounds is sent to a neural network in which the string of characters is divided into individual features, either on the basis of phonetically, semantically, and/or lexically stored information, or simply on the basis of separating markers (for example spaces, pauses in speech) in the sequence of characters. These features may be short chains of characters/words or certain sounds and combinations of sounds. On the basis of this sequence of features, the neural network compiles combinations of features that, taking the information from a lexicon containing lexical, semantic, and/or phonetic information into account, combines said combinations of features in such a way that they have a defined meaningful content. The neural network generates a large number of these combinations of features and compares them in the form of chronologically coded neurons with the sequence of features. Finally, the meaningful content of those combinations of features that, while minimizing contradictions, possesses a high degree of agreement with the sequence of features is used. The defined meaningful content can be transformed into an executable command that causes an action to occur, such as an output, query, etc., in accordance with a specified command statement in the computer software.

If the sequentially performed comparison of the sequence of features with the combination of features created by the neural network does not yield a satisfactory result, an attempt may be made to leave parts of the sequence of features that have a relatively good agreement with a combination of features unchanged and, for example, through the aid of a fuzzy logic, change those parts of the sequence of features that do not have any agreement or that only have low agreement with the combination of features.

If, in the comparison with all of the combinations of features no satisfactory result is ultimately achieved, the sequence of features generated in the neural network is redefined, for example, in the case of a sequence of sounds to change how the associated sounds—in other words, the features—are defined and put together. Using this newly created sequence of features, a comparison can be made with the combination of features found by the neural network.

If there is only a partial agreement between the sequence of features and a combination of features, the agreeing part of a display or output unit can be represented as being recognized, and a request to input the unknown part again can be generated.

In the memory for lexical and/or semantic knowledge a temporary memory area in which agreeing features and combinations of features from the just-completed recognition activity can be saved, can be provided, so that the neural network can access said features and combinations of features on a preferential basis to generate the combinations of features. This way, the system will focus on an area of topics or meaning that is being addressed. This significantly improves the detection of the characters or sound sequences.

The invention permits one to input questions or commands into an input terminal, in a completely freeform manner without knowledge of the command language or the command terminology, and thereby initiate certain actions controlled by software. The method of the invention and the device of the invention hereby function as an interface between the freeform arbitrary subjective input and the specified command statement required by the computer software. The invention functions as an intelligent interface that adjusts itself to subjective peculiarities in the input and automatically focuses recognition on specific topics or meaningful areas or command areas.

In the memory for the lexical knowledge, sequences of characters or sequences of sounds can be stored together with their meaningful content and semantic information, so that the neural network can, on the basis of the compiled semantic information, generate meaningful contents of the combination of features that are close to the sequence of features relative to their sounds or sequence of characters. Said closeness may be recognized on the basis of characteristic series of vowels, series of consonants, or vowel/consonant combinations.

The device for recognizing the meaning or the content of phonetic sequences of sounds or of the sequences of characters must comprise an input device into which a text may be spoken or input, for example by means of a keyboard. Although with an input series of characters, the sequence of features usually is specified by means of separating characters, such as spaces, the sequence of features in a series of phonetic sounds must be generated by the neural network itself. In doing so, it utilizes the saved lexical and semantic knowledge in the memory areas that the neural network accesses.

The generation of the sequence of features can be accomplished using associative word recognition, in which sequences of sounds or characters whose existence in the sound or character sequence is represented by a vector are formed from sounds or character components. In addition, the vector can also contain statements, for example those of a semantic nature, and/or statements in conjunction with the specified control parameters used by a computer program. The recognition can be accomplished by comparing the vector of the input sound or character sequence with the stored vectors.

When the neural network generates the combination of features, the generation of the combination of features can take place at the same time as the meaningful content is established, which, as a predefined control command used in a computer program, directly initiates a certain action. However, the comparison of features can also be performed with combinations of features that on their own contain a meaningful statement. This agreeing combination of features can then be checked to see whether the meaningful statement agrees with a specified control command.

The invention is described below based on the schematic diagram, which is provided by way of example.

FIG. 1 shows a recognition apparatus 10 for phonetic sequences or character sequences that are input via an input device 12. The input device may, for example, be a keyboard or a microphone. The phonetic string or character string is then sent to a neural network 14, which is connected to a large knowledge memory 16, in which lexical, semantic knowledge as well as knowledge about the corresponding phonetic features of the lexical terms is stored. The memory 16 contains a temporary memory 18, whose meaning will be discussed in greater detail below. The neural network is also connected to a fuzzy logic 20, whose purpose is to process features or combination of features that are not recognized as being in agreement. In addition, the neural network 14 is connected to an output interface 22, within which permissible command statements for specific desired actions, such as an output or a query, etc. are stored.

Figure 2:
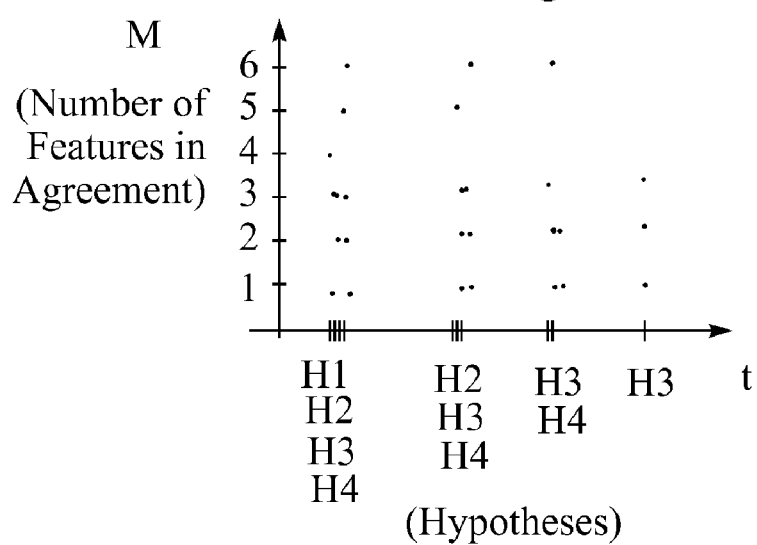
FIG. 2 shows a graph where the .abscissa contains a listing of features in agreement and the ordinate represents an axis of time that shows comparisons of sequences of features with different hypotheses.

The activities of the recognition means in FIG. 1 are described below. The character string or phonetic string that is input into the neural network 14 is divided into a series of features. This division can either be made on the basis of separating characters in a character string or, for example, on the basis of pauses in speaking in a phonetic sequence. However, the division can also be made on the basis of information from the memory 16. The subdivided individual components of the sequence form features, so that the phonetic or character sequence is transformed into a sequence of features that can be investigated in the neural network for its content. This recognition of content is achieved by comparing time-coded neurons. The neural network establishes hypotheses in the form of combinations of elements that are similar to the sequence of features and that have a defined meaningful content. The neural network accordingly creates, in accordance with the semantic and lexical knowledge that is available in the memory 16, a large number of such combinations of features that can be sequentially compared with the sequence of features of the phonetical or character string. FIG. 2 shows such a comparison process. In this case, the abscissa contains a listing of the features that are in agreement, in this example from 1 to 6, and the ordinate represents an axis of time that shows the comparison of the sequence of features of the phonetic string or the character string with the combinations of different hypotheses H1 to H4. For each hypothesis, the number of contradictions relative to the features of the sequence of features and/or relative to the lexical/semantic knowledge and/or relative to the-command statement in the data interface 22 is determined. At a first point in time, all four hypotheses H1 to H4 are compared with the sequence of features. After the first comparison, one hypothesis that has the most contradictions is eliminated. At the second point in time, the remaining hypotheses are checked again, but this time taking new parameters (command statement compatibility etc.) into account if necessary. This once again results in the elimination of the most contradictory hypothesis. The comparisons are repeated until there remains one hypothesis (combination of features) that has a good agreement relative to the sequence of features and that has the least number of contradictions. The meaning content that is assigned to the remaining hypothesis is defined as the meaningful content of the sequence of features. In the comparison, one parameter was already taken into account, namely whether the statement of the combination of characteristics agrees with a command in the output interface 16 or whether it can be transformed into such a command.

If it turns out in the comparison of features that the combination of features only agrees with a hypothesis in some areas, by feeding in the part of the sequence that is not recognized into the fuzzy logic, in combination with the lexical and semantic knowledge from the memory 16, an attempt can be made to compare the unrecognized sequence of features, weighting the sequence and the interaction of the features with similar known combinations of features, whereby the sequence of the features can be taken into account as an additional parameter in the weighting of similarity. This way, unrecognized phonetic sequences or sequences of characters still can possibly be recognized by interpreting the sequence. If this process likewise does not lead to any result, the detected character and/or phonetic component can be shown on a display, and questions can be asked regarding the meaning, description, or modified input of the non-recognized phonetic or character string. In this way the operator can learn what statements he or she must define with greater precision.

Needless to say, only hypotheses that at least to a great extent match will result in a success whose statement corresponds to the command statement of an output or action interface 22. This may taken into account if the neural network only creates hypotheses whose meaningful contents correspond to the command statement of the output interface or in that only hypotheses (combinations of features) that are matching or largely matching be used, if in a subsequent comparison operation a command from the command statement of the interface 22 can be assigned to the meaningful content of these hypotheses. The output interface 22 may be the input area of a computer program or of various computer programs by which various actions can be initiated. For example, the recognition apparatus 10 can be used in an information terminal in an airport or in a train station. Such a recognition means can also be used to control terminals or computers in order to permit access to data, in which case the system would be able to establish correlations between different data on the basis of the keyed-in/spoken links. Such a terminal therefore would not be used only to output data, but rather it would also be used to recompile data and to generate new data. Preferably, the device contains a display for representing the command that is known or that is derived from the sequence of characters or phonemes. This command may also need to be confirmed by the operator, before the action can be performed. This would make it possible to prevent incorrect actions from being initiated.

What is claimed is:

1. A method for recognizing a phonetic sequence of sounds comprising:
   a) sending the phonetic sequence of sounds to a neural network implemented on a computer,
   b) forming by the neural network a sequence of features from the phonetic sequence taking into account phonetic stored information,
   c) selecting a reference combination of features from saved semantical information on the basis of the sequence of features formed in step b), said reference combination of features having a defined meaningful content, and comparing the sequence of features formed in step b) with the reference combination of features,
   d) repeating step c) with new reference combinations of features until, by minimizing contradictions, a reference combination of features that substantially agrees with the sequence of features formed in step b) is found, and
   e) if the reference combination of features found in step d) matches one of a plurality of predetermined acceptable combinations of features,
      then outputting the meaningful content of the reference combination of features found in step d) as a result,
      else forming a new sequence of features by the neural network in accordance with step b), and repeating steps c) to e).

2. A method according to claim 1, wherein an earlier iteration of steps c) to e) comprises storing a reference combination of features found in step d) in a temporary memory and a later iteration of steps c) to e) comprises comparing the sequence of features with the stored reference combination of features.

3. A method according to claim 2, comprising assigning the agreeing reference combination of features to a specific statement area or topic area of the temporary memory on the basis of stored lexical information, and using primary features from said statement area or topic areas to form a reference combination of features.

4. A method according to claim 1, comprising, if no agreeing reference combination of features is found in step d), changing a non-agreeing part of the sequence of features on the basis of a combination of features having as many feature agreements as possible, and executing steps c) to e) with the changed sequence of features.

5. A method according to claim 4, comprising changing the non-agreeing part of the sequence of features using a fuzzy logic in a manner that takes account of the similarity and sequence of the meaningful content defined in reference combinations of features, provided such similarity meets a predetermined requirement.

6. A method according to claim 1, wherein step b) comprises generating vectors that are characteristic of the sequence and/or properties of phonetic sequences and step c) comprises comparing the sequence of features formed in step b) with the reference combination of features on the basis of comparison of vectors.

7. A device for detecting a phonetic sequence of sounds, said device comprising:
   an input device for inputting speech,
   a first memory containing lexical, semantic and phonetic information,
   a second memory containing permissible command statements,
   a neural network that accepts the phonetic sequence input in the input device, the neural network having a first level that forms a sequence of features from the phonetic sequence, taking into account the information in the first memory, and also having a second level that, using the information from the first memory, forms combinations of features having a defined meaningful content,
   a comparison device for comparing the sequence of features formed by the first level of the neural network with the combinations of features formed by the second level of the neural network,
   an evaluation device for evaluating contradictions between posited combinations of features with the sequence of features,
   a device that, depending on the result of the evaluation, causes the first level of the neural network to form a new sequence of features, and
   an output device for displaying the meaningful content of the least contradictory combination of features or for performing a command associated with the meaningful content of the least contradictory combination of features.

8. A device according to claim 7, comprising a fuzzy logic for changing at least part of the sequence of features taking into account the similarity and sequence of features with combinations fo features stored in the first memory, the fuzzy logic having an output side connected to the second level of the neural network.

9. A device according to claim 7, comprising a temporary memory for storing a recognized combination of features, the temporary memory being connected on its output side to the second level of the neural network.

10. A method for recognizing a sequence of characters comprising:
    a) sending the sequence of characters to a neural network implemented on a computer,
    b) forming by the neural network a sequence of features from the sequence of characters taking into account lexical stored information, c) selecting reference combination of features from saved lexical information on the basis of the sequence of features formed in step b), said reference combination of features having a defined meaningful content, and comparing the sequence of features formed in step b) with the reference combination of features, d) repeating step c) with new reference combinations of features until, by minimizing contradictions, a reference combination of features that substantially agrees with the sequence of features formed in step b) is found, and e) if the reference combination of features found in step (d) matches one of a plurality of predetermined acceptable combinations of features, then outputting the meaningful content of the reference combination of features found in step (d) as a result, else forming a new sequence of features by the neural network in accordance with step b), and repeating steps c) to e).

11. A method according to claim 10, wherein an earlier iteration of steps c) to e) comprises storing a reference combination of features found in step d) in a temporary memory and a later iteration of steps c) to e) comprises comparing the sequence of features with the stored reference combination of features.

12. A method according to claim 11, comprising assigning the agreeing reference combination of features to a specific statement area or topic area of the temporary memory on the basis of stored lexical information, and using primary features from said statement area or topic areas to form a reference combination of features.

13. A method according to claim 10, comprising, if no agreeing reference combination of features is found in step d), changing a non-agreeing part of the sequence of features on the basis of a combination of features having as many feature agreements as possible, and executing steps c) to e) with the changed sequence of features.

14. A method according to claim 13, comprising changing the non-agreeing part of the sequence of features using a fuzzy logic in a manner that takes account of the similarity and sequence of the meaningful content defined in reference combinations of features, provided such similarity meets a predetermined requirement.

15. A method according to claim 10, wherein step b) comprises generating vectors that are characteristic of the sequence and step c) comprises comparing the sequence of features formed in step b) with the reference combination of features on the basis of comparison of vectors.

16. A method according to claim 10, wherein in step b), the neural network forms the sequence of features from the sequence of characters taking into account both the lexical stored information and predetermined characters.

17. A device for detecting a sequence of characters, said device comprising:

an input device for inputting characters, a first memory containing lexical information, a second memory containing permissible command statements, a neural network that accepts the sequence of characters input by the input device, the neural network having a first level that forms a sequence of features from the sequence of characters, taking into account the information in the memory and also having a second level that, using the information from the first memory, forms combinations of features having a defined meaningful content, a comparison device for comparing the sequence of features formed by the first level of the neural network with the combinations of features formed by the second level of the neural network, an evaluation device for evaluating contradictions of posited combinations of features with the sequence of features, a device that, depending on the result of the evaluation, causes the first level of the neural network to form a new sequence of features, and an output device for displaying the meaningful content of the least contradictory combination of features or for performing a command associated with the meaningful content of the least contradictory combination of features.

18. A device according to claim 17, comprising a fuzzy logic for changing at least part of the sequence of features taking into account the similarity and sequence of features with combinations of features stored in the first memory, the fuzzy logic having an output side connected to the second level of the neural network.

19. A device according to claim 17, comprising a temporary memory for storing a recognized combination of features, the temporary memory being connected on its output side to the second level of the neural network.

* * * * *

UNITED STATES PATENT AND TRADEMARK OFFICE
CERTIFICATE OF CORRECTION

| | | |
|---|---|---|
| PATENT NO. | : 7,966,177 B2 | Page 1 of 1 |
| APPLICATION NO. | : 10/486847 | |
| DATED | : June 21, 2011 | |
| INVENTOR(S) | : Hans Geiger | |

It is certified that error appears in the above-identified patent and that said Letters Patent is hereby corrected as shown below:

Column 6, Line 54, Claim 8:

After "with combinations" delete "fo" and insert -- of --.

Signed and Sealed this

Twenty-second Day of November, 2011

David J. Kappos
*Director of the United States Patent and Trademark Office*